April 14, 1970    L. R. ERWIN ET AL    3,506,024
VORTEX FLUID AMPLIFIER OF LAMINATED CONSTRUCTION
Filed May 8, 1968
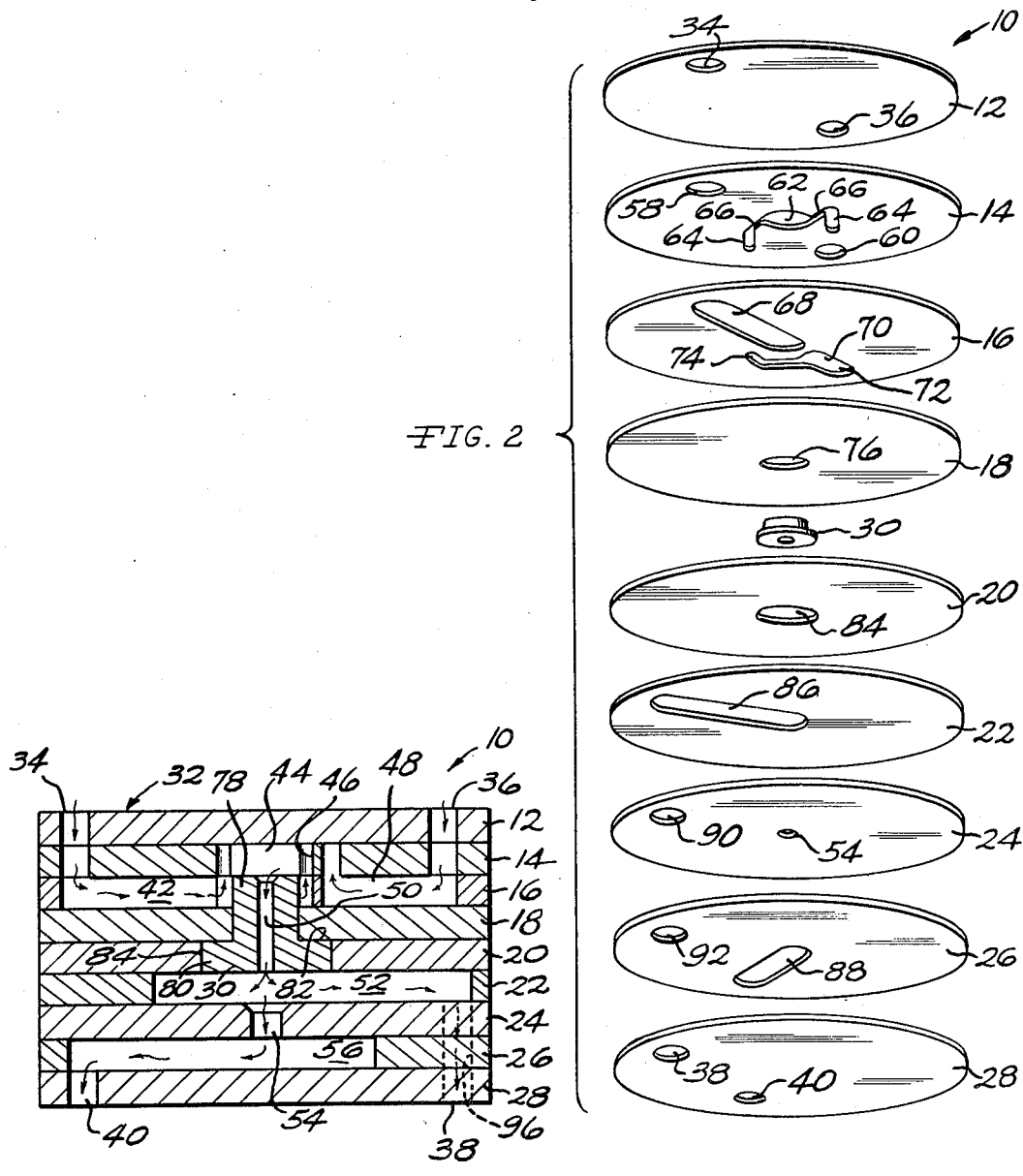
INVENTORS
LOUIS R. ERWIN
ROBERT S. KIWAK
CLARENCE E. VOS
BY
ATTORNEY //
United States Patent Office 3,506,024
Patented Apr. 14, 1970

---

3,506,024
VORTEX FLUID AMPLIFIER OF LAMINATED CONSTRUCTION
Louis R. Erwin, Livonia, Robert S. Kiwak, Dearborn Heights, and Clarence E. Vos, Dearborn, Mich., assignors to The Bendix Corporation, a corporation of Delaware
Filed May 8, 1968, Ser. No. 727,449
Int. Cl. F15c 1/16
U.S. Cl. 137—81.5     6 Claims

ABSTRACT OF THE DISCLOSURE

A vortex amplifier consisting of a plurality of flat laminae secured together so as to form an integral body. The laminae are formed with through openings and cooperate with an integral button member to form, in the body, a vortex chamber, an inlet passage for supply fluid communicating with the chamber, inlet passages for control fluid communicating with the chamber, a pick-off orifice aligned with and spaced axially from an exit passage in the button, a vent passage communicating with the exit passage, and an output passage communicating with the pick-off orifice.

CROSS REFERENCE TO RELATED APPLICATIONS

Laminated vortex amplifiers similar to the vortex amplifier disclosed in this application are disclosed in copending applications Ser. No. 705,779, filed Feb. 15, 1968, and Ser. No. 705,780, filed Feb. 15, 1968, both of which are assigned to the assignee of this application.

BACKGROUND OF THE INVENTION

Vortex amplifiers are conventionally made by machining all of the components including the internal button member, the injector passages, and the pick-off orifices. Accurate machining of such components is not only difficult and expensive, but it is also difficult to accurately assemble machined components so that the cavities therein will form the accurately related passages and chambers required in the vortex amplifier. It is known to construct vortex amplifiers by assembling a plurality of plates, such as shown in U.S. Patents 3,216,439 and 3,233,621, for example, but in vortex amplifiers of this type the necessary amplifier passages and cavities are formed by molding, milling, or casting cavities and passages in the various plates. Amplifiers constructed in this manner are difficult to accurately manufacture and assemble.

It is an object of this invention, therefore, to provide an improved vortex fluid amplifier of laminated construction in which all of the laminae which cooperate to form the necessary internal chambers and passages in the amplifier are formed with through holes thereby facilitating the accurate manufacture of the amplifier utilizing punching and/or photoetching techniques in contrast to more expensive machining, casting and molding techniques in other amplifiers.

SUMMARY OF THE INVENTION

The vortex amplifier of this invention consists of a plurality of smooth flat laminae and an internal button member secured together so as to form an integral body. The laminae and the button member are all formed with through openings which can be accurately located and formed by processes such as etching, punching and drilling at an economical cost. The basic structural material employed in the vortex amplifier of this invention is flat metal shim stock having a thickness on the order of 0.005 inch which is an available material that is closely controlled in thickness and is inherently low priced for the thickness tolerance available.

The shim stock laminae are readily secured together, such as by a diffusion bonding process, so as to form the amplifier body having a vortex chamber, an inlet passage for supply fluid, inlet passages for control fluid, an exit passage, a pick-off orifice, a vent passage, and an outlet passage. This construction of the amplifier takes maximum advantage of the dimensional consistency of shim stock to provide accurate control of the amplifier dimensions which must be controlled within precise tolerances such as the vortex chamber length, and the size and spacing of the passages and the pick-off orifice. The amplifier is formed such that in most cases the chamber and passage walls are formed by the natural laminae surfaces to take advantage of the naturally smooth finish on shim stock, thereby reducing losses in the amplifier. In other cases the flow in the amplifier is directed generally parallel to the laminae surfaces to reduce losses.

Further objects, features and advantages of this invention will become apparent from a consideration of the following description, the appended claims, and the accompanying drawing in which:

FIGURE 1 is a schematic cross sectional view of a vortex amplifier constructed according to this invention; and FIGURE 2 is an exploded perspective view of the vortex amplifier shown in FIG. 1.

With reference to the drawing, the vortex amplifier of this invention, indicated generally at 10, is illustrated in the drawing as consisting of nine flat plate-type laminae 12, 14, 16, 18, 20, 22, 24, 26 and 28 and an internal button member 30 arranaged in a stacked relation and secured together so as to form an integral body 32. As shown in FIG. 1, the body 32 has an inlet port 34 for supply fluid, an inlet port 36 for control fluid, an outlet port 38 for vent fluid and an outlet port 40 for output fluid. The inlet port 34 communicates with an inlet passage 42 in the body 32 which supplies fluid to a vortex chamber 44 having a cylindrical outer wall 46. The inlet port 36 communicates with an inlet passage 48 for control fluid which also communicates with the vortex chamber 44.

The button member 30 is provided with an axial exit passage 50 which communicates at one end with the vortex chamber 44 and at the opposite end with a vent passage 52 in the body 32. The vent passage also communicates with the outlet port 38. A pick-off orifice 54 is formed in the body 32 at a position axially aligned with the exit passage 50 and spaced a predetermined distance therefrom. Fluid flowing through the pick-off orifice 54 flows into an output passage 56 which communicates with the outlet port 40.

As shown in FIG. 2, the above-described ports, chamber, passages and orifice in the body 32 are formed by providing through holes in all of the structural elements which form the body 32, namely, the laminae 12–28, inclusive, and the internal button member 30. More specifically, the base plate lamina 12 is formed with through holes which constitute the inlet ports 34 and 36, and the lamina 14 is formed with openings 58 and 60 which are aligned with the ports 34 and 36. The lamina 14 is also formed with a center opening 62 which forms part of the vortex chamber 44 and which is connected to irregularly shaped slots 64. The slots 64 are connected to through passages 66 in the lamina 14 which extend tangentially into the opening 62 for a purpose to appear presently.

The lamina 16 is formed with an elongated substantially radially extending slot 68 which is aligned at its outer end with the openings 34 and 58 in the laminae 12 and 14, respectively, so that the slot 68 can receive fluid admitted to the inlet port 34. The radially inner end of the slot 68 is concentrically aligned with the opening 62 in the lamina 14 and cooperates therewith to form the vortex chamber 44 and the outer wall 46 thereof. The lamina 16 is also formed with an irregularly shaped slot 70 which has a portion 72 aligned with the openings 36 and 60 in the laminae 12 and 14, respectively, so that fluid can flow into the slot 70 from the inlet port 36. The slot 70 also has portions 74 aligned with the slots 64 in the lamina 14 so that fluid in the slot 70 can flow into the slots 64 for subsequent flow through the passages 66 as tangentially directed jets into the vortex chamber 44. The lamina 18 has a centrally located through opening 76 which is smaller than the opening 62 in lamina 14 for a purpose to appear presently.

The button member 30 is generally cylindrical in shape having a first portion 78 and a second portion 80 which are of different diameters. The portion 78 is of a reduced diameter relative to the portion 80 and a generally flat external surface 82 is formed at the juncture of the portions 78 and 80. As shown in FIG. 1, the opening 76 in the lamina 18 is of substantially the same diameter as the diameter of the smaller button portion 78. The smaller button portion 78 is extended through the opening 76 in the lamina 18 so that the button surface 82 engages one side of the lamina 18 and a fluid tight assembly of the lamina 18 and the button 30 is provided. The slot 68 in the lamina 16 is of a size at its radially inner end so that it is spaced from the button portion 78 enabling fluid to flow from the slot 68 around the button portion 78 and into the opening 62 in the lamina 14.

The lamina 20 has a central opening 84 which is of a diameter corresponding substantially to the diameter of the larger button portion 80 and is concentrically assembled with the button portion 80 as shown in FIG. 1. The lamina 22 is formed with an elongated radially extending slot 86. It is to be noted that the opening 84 need not be precisely formed to exact tolerances throughout its axial length. This is important because the amplifier construction thus enables the hole 84 to be formed inexpensively by etching which leaves a generally tapered inner edge that adequately positions the button 30 but cannot make a tight seal. The slot 86 is narrower in width than the button portion 80, thereby enabling the button portion 80 to be firmly supported between the laminae 18 and 22 so that the required seal is formed at the button surface 82.

The lamina 24 is formed with a centrally located opening which forms the pick-off orifice 54 in the amplifier 10. The lamina 26 is formed with an elongated substantially radially extending slot 88 located so that it is aligned with the pick-off orifice 54 and the outlet opening 40 formed in the lamina 26. The laminae 24 and 26 are also formed with aligned openings 90 and 92, respectively, which cooperate to form a passage 96 in the body 32 that extends between the vent passage 52 and the vent outlet opening 38 formed in the base plate lamina 28.

It can thus be seen that all of the openings formed in the laminae 12–28, inclusive, and the button member 30, are through openings located so that when the laminae and the button member are assembled, the body 32 will be formed with the above-described vortex chamber 44, inlet passage 42 for supply fluid, inlet passage 48 for control fluid, vortex chamber exit passage 50, vent passage 52, pick-off orifice 54, and output passage 56.

In the operation of the amplifier 10, supply fluid entering the inlet passage 42 flows around the button 30 into the vortex chamber 44. It is to be understood that several laminae, identical to the lamina 14, in a number selected to provide a vortex chamber 44 of desired length and total injector area of slots 66, can be used, even though only a single lamina 14 is illustrated. Control fluid from the inlet passage 48 enters the vortex chamber 44 through the tangential passages 66 so as to impart swirl to the fluid in the chamber 44. The swirling fluid exits from the chamber 44 through the exit passage 50 from which it emerges as a cone-shape stream with the magnitude of divergence of the fluid in the emerging stream being related to the pressure of control fluid entering the vortex chamber 44 through the passages 66. Some of this fluid travels through the vent passage 52 and the passage 96 to the outlet port 38. Some of this fluid also enters the pick-off orifice 54 for flow through the output passage 56 to the outlet port 40. The laminated construction of the body 32 enables accurate location of the pick-off orifice 54 relative to the exit passage 50 by selecting the desired number of spacer lamina 22, only one of which is illustrated in the drawing. In addition, since the side faces of the laminae 24 and 26 form the walls of the output passage 56, these walls are readily formed of the desired smoothness by employing smooth surface laminae 24 and 28, thereby avoiding the necessity for polishing milled or cast channels.

It can thus be seen that this invention provides a laminated vortex fluid amplifier construction in which all of the structural elements are formed with through openings thereby providing the amplifier with the above-described advantages and enabling the economical construction of accurately dimensioned amplifiers. It is to be noted that some of the laminae are substantially identical. For example, the laminae 22 and 26 are practically identical as are the lamine 12 and 28. The laminae 22 and 26 are termed "universl port plates" and can be stocked as standard amplifier components. In other words, the laminae 22 and 26 can be provided with a plurality of openings like the one illustrated at 92, and arranged so that only the desired openings align with other openings in the other laminae. In other words, the lamina 22 could have a number of openings, like the opening 92, without affecting the structure or operation of the amplifier 10. Similarly, the laminae 12 and 28, which are termed "base plates," can each have a number of openings like those illustrated, and only the desired ones are aligned with other openings and used.

It is to be understood that the laminae can be of shapes other than the circular shape illustrated and the slots 68, 86 and 88 can be directed other than radially. Also the ports 34, 36, 38 and 40 can be located in a single lamina, if desired. The location of these ports in surfaces defined by laminae surfaces enables easy sealing of the ports with other apparatus. It is also to be noted that the laminae construction of the amplifier 10 enables easy and accurate assembly by using construction holes in identical locations in all of the laminae. By using these holes which are eliminated in the drawing for purposes of clarity, the laminae can be accurately aligned by either visual alignment or by the use of pins (not shown), which can be either permanent or temporary.

The laminae in the body 32 can be formed of materials other than metal and the amplifier 10 is constructed so as not to require internal supports during assembly. As a result, the amplifier can be assembled by clamping the laminae together, which is advantageous during experimental use.

What is claimed is:

1. A vortex device comprised of a plurality of structural elements secured together so as to form a body having a vortex chamber provided with a generally cylindrical outer wall, one of said structural elements forming said vortex chamber being a button member, an inlet passage for supply fluid communicating with said chamber, means for imparting a control rotational velocity to said supply fluid in said chamber, an exit passage communicating with said chamber, a pick-off orifice aligned with and spaced axially from said exit passage, a vent passage communicating with said exit passage, and an output passage communicating with said pick-off orifice, said structural members having through openings formed therein, and said structural members being relatively arranged so that said through openings therein form said chamber, said passages and said orifice.

2. A vortex device according to claim 1 wherein said exit passage communicating with said chamber comprises a through opening in said button member, and wherein the remainder of said structural members are flat laminae.

3. A vortex device according to claim 2 wherein some of said through openings in said flat laminae are in the form of elongated slots and said slots form said inlet passages, said vent passage and said output passage.

4. A vortex device according to claim 2 wherein at least one of said laminae is formed with a through slot which constitutes said inlet passage for supply fluid, said one laminae having said button member extending through said slot in a clearance relation with said one laminae so that fluid in said inlet passage can flow around said button member.

5. A vortex device according to claim 2 wherein said amplifier is generally cylindrical in shape having a first portion of one diameter and a second portion of a greater diameter and a flat annular surface at the juncture of said portions, one of said laminae being positioned in surface-to-surface fluid tight engagement with said flat annular surface.

6. A vortex device according to claim 4 wherein said laminae are arranged in surface-to-surface contact and relative to said button member so as to form said chamber at one end of said exit passage in said button member and form said vent passage between said button member and said pick-off orifice at the opposite end of said exit passage.

References Cited

UNITED STATES PATENTS

| | | | |
|---|---|---|---|
| 3,285,265 | 11/1966 | Boothe et al. | 137—81.5 |
| 3,290,947 | 12/1966 | Reilly | 137—81.5 X |
| 3,373,759 | 3/1968 | Adams | 137—81.5 |
| 3,431,930 | 3/1969 | Bowles | 137—81.5 |

M. CARY NELSON, Primary Examiner

W. R. CLINE, Assistant Examiner